(12) United States Patent
Takahashi

(10) Patent No.: US 6,191,208 B1
(45) Date of Patent: Feb. 20, 2001

(54) THERMALLY STABLE PERFLUOROELASTOMER COMPOSITION

(75) Inventor: Kohtaro Takahashi, Saitama (JP)

(73) Assignee: Dupont Dow Elastomers L.L.S., Wilmington, DE (US)

(*) Notice: Under 35 U.S.C. 154(b), the term of this patent shall be extended for 0 days.

(21) Appl. No.: 09/312,187

(22) Filed: May 14, 1999

Related U.S. Application Data

(60) Provisional application No. 60/086,109, filed on May 20, 1998.

(51) Int. Cl.$^7$ ................ C08J 3/00; C08K 3/34; C08K 3/40; C08L 27/12
(52) U.S. Cl. .............. 524/494; 524/492; 524/493; 524/544
(58) Field of Search ............... 524/492, 493, 524/494, 544

(56) References Cited

U.S. PATENT DOCUMENTS

| | | | |
|---|---|---|---|
| 3,332,907 | 7/1967 | Angelo et al. | 260/47 |
| 3,956,000 | 5/1976 | Kuhls et al. | 106/270 |
| 4,281,092 | 7/1981 | Breazeale | 526/247 |
| 4,879,362 | 11/1989 | Morgan | 526/247 |
| 5,187,222 | 2/1993 | Abe et al. | 524/492 |
| 5,565,512 | 10/1996 | Saito et al. | 525/340 |
| 5,696,189 | 12/1997 | Legare | 524/232 |
| 5,789,509 | 8/1998 | Schmiegel | 526/247 |

FOREIGN PATENT DOCUMENTS

| | | |
|---|---|---|
| 0 712 842 A1 | 5/1996 | (EP). |
| WO 95/22575 | 8/1995 | (WO). |
| WO 97/19983 | 6/1997 | (WO). |
| WO 9719982 | 6/1997 | (WO). |

OTHER PUBLICATIONS

Juergen W. Pohl, *Trends in Rubber Mixing, Rubber World*, Mar. 1998, vol. 217, No. 6, pp. 22, 26 and 27.

*Primary Examiner*—Patrick D. Niland

(57) ABSTRACT

Curable perfluoroelastomer compositions comprising A) a perfluoroelastomer having copolymerized units of tetrafluoroethylene, a perfluoro(vinyl ether), and a nitrile-containing cure site monomer, B) anhydrous silica, and C) a curing agent exhibit excellent thermal stability and reduced tendency to generate hydrogen fluoride under high temperature conditions.

15 Claims, No Drawings

THERMALLY STABLE PERFLUOROELASTOMER COMPOSITION

REFERENCE TO RELATED APPLICATION

This application claims the benefit of U.S. Provisional Application No. 60/086,109, filed May 20, 1998.

FIELD OF THE INVENTION

This invention relates to perfluoroelastomer compositions having a reduced tendency to generate hydrogen fluoride on heating.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. These polymers are often used in seals for aircraft engines, in oil-well drilling devices, and in sealing elements for industrial equipment used at high temperatures.

Sealing components used in equipment for manufacture of electronic components, for example semi-conductor devices, must meet unusually stringent property requirements. Specifically, the seals are often exposed to reactive plasmas, corrosive cleaning gases and high temperatures, often up to about 300° C., that cause rapid deterioration of physical properties. In addition, polymer degradation can occur under the high temperature conditions encountered, leading to production of hydrogen fluoride (HF) which is a highly corrosive compound. A particular problem associated with HF is that its presence causes corrosion of any steel and quartz materials present in the semi-conductor manufacturing equipment.

Although conventional perfluoroelastomers are satisfactory for most uses, it would be desirable to have available a more resistant perfluoroelastomer composition. That is, an unmet need exists for perfluoroelastomer compositions that will function satisfactorily in the unusual and demanding process conditions found in electronics manufacturing, and, in addition will evolve only minimal amounts of HF when heated at temperatures of about 300° C.

SUMMARY OF THE INVENTION

The present invention is directed to a curable perfluoroelastomer composition that has a reduced tendency to generate HF on heating to high temperatures. More specifically, the present invention is directed to a curable composition comprising
A. a perfluoroelastomer comprising copolymerized units of (1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers;
B. 1–25 parts per hundred parts perfluoroelastomer of an anhydrous silica; and
C. a curative for the perfluoroelastomer.
In a preferred embodiment of the invention the curative comprises diaminobisphenol AF. Such compositions exhibit accelerated cure response.

DETAILED DESCRIPTION OF THE INVENTION

The compositions of the present invention are based on elastomeric perfluoropolymers (hereinafter "perfluoroelastomers"), that is, substantially fully fluorinated fluoropolymers which, when cured, exhibit an elastomeric character. The perfluoroelastomers contain nitrile groups which render the polymers crosslinkable.

Perfluoroelastomers are polymeric compositions having copolymerized units of at least two principal perfluorinated monomers. Generally, one of the principal comonomers is a perfluoroolefin, while the other is a perfluorovinyl ether. Representative perfluorinated olefins include tetrafluoroethylene and hexafluoropropylene. Suitable perfluorinated vinyl ethers are those of the formula $$CF_2=CFO(R_fO)_n(R_f'O)_mR_f'' \qquad (I)$$

where $R_f$ and $R_{f'}$ are different linear or branched perfluoroalkylene groups of 2–6 carbon atoms, m and n are independently 0–10, and $R_f''$ is a perfluoroalkyl group of 1–6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of perfluoro(alkyl vinyl) ethers includes those ethers wherein n is 0 or 1 and $R_f$ contains 1–3 carbon atoms. Examples of such perfluorinated ethers include perfluoro(methyl vinyl) ether and perfluoro(propyl vinyl) ether. Other useful monomers include compounds of the formula $$CF_2=CFO[(CF_2)_mCF_2CFZO]_nR_f \qquad (III)$$

where $R_f$ is a perfluoroalkyl group having 1–6 carbon atoms,
m=0 or 1, n=0–5, and Z=F or $CF_3$.
Preferred members of this class are those in which $R_f$ is $C_3F_7$, m=0, and n=1.

Additional perfluoro(alkyl vinyl) ether monomers include compounds of the formula $$CF_2=CFO[(CF_2CFCF_3O)_n(CF_2CF_2CF_2O)_m(CF_2)_p]C_xF_{2x+1} \qquad (IV)$$

where m and n=1–10, p=0–3, and x=1–5.
Preferred members of this class include compounds where n=0–1, m=0–1, and x=1.

Examples of useful perfluoro(alkoxy vinyl) ethers include $$CF_2=CFOCF_2CF(CF_3)O(CF_2O)_mC_nF_{2n+1} \qquad (V)$$

where n=1–5, m=1–3, and where, preferably, n=1.

Mixtures of perfluoro(alkyl vinyl) ethers and perfluoro (alkoxy vinyl) ethers may also be used.

Preferred perfluoroelastomers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

The perfluoropolymer further contains copolymerized units of at least one cure site monomer, generally in amounts of from 0. 1–5 mole percent. The range is preferably between 0.3–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2–12, preferably 2–6;

$$CF_2=CF-O[CF_2-CFCF_3-O]_n-CF_2-CFCF_3-CN \quad (VII)$$

where n=0–4, preferably 0–2;

$$CF_2=CF-[OCF_2CF(CF_3)]_x-O-(CF_2)_n-CN \quad (VIII)$$

where x=1–2, and n=1–4; and $$CF_2=CF-O-(CF_2)_n-O-CF(CF_3)CN \quad (IX)$$

where n=2–4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

The second component of the curable compositions of the invention is an anhydrous silica (generally an acidic silica having a pH less than 7, preferably a pH of 4–5, or fumed silica). Such silicas are available from Degussa Aktiengesellschaft (Frankfurt, Germany) under the Aerosil® trademark. A particularly useful type is Aerosil® 200 silica. Other suitable silicas include Reolosil® silicas, available from Tokuyama KK (Tokyo, Japan), for example Reolosil® QS13, Reolosil® QS102, and Reolosil® QS30. Amounts of 1–25 parts per hundred parts perfluoroelastomer (phr) are effective to reduce HF generation. However, it is preferable to use no more than 1–7 phr because at higher concentrations of silica the compression set resistance of cured perfluoroelastomer seals deteriorates (i.e. increases). If less than 1 phr anhydrous silica is used, the degree of corrosion becomes unacceptable for many applications.

The third component of the curable compositions of the invention is a compound which is capable of crosslinking the perfluoroelastomer, for example an organotin compound or certain amino group-containing benzene compounds. Suitable organotin compounds include allyl-, propargyl-, triphenyl- and allenyl tin curatives. Tetraalkyltin compounds or tetraaryltin compounds are the preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5–10 phr of curing agent can be used, and 1–4 phr is satisfactory for most purposes. It is believed that the nitrile groups trimerize to form s-triazine rings in the presence of curing agents such as organotin, thereby crosslinking the perfluoroelastomer. The crosslinks are thermally stable, even at temperatures of 275° C. and above. When decarboxylated or partially-decarboxylated perfluoroelastomers, for example those disclosed in U.S. Pat. No. 5,789,509 are utilized as the polymeric component of the compositions of the present invention, it is preferable to use an accelerator, usually an ammonium salt of an acid, such as ammonium perfluorooctanoate. In addition, ammonium salts of organic and inorganic acids may be used as curing agents themselves in the practice of the present invention. Suitable ammonium salts and quantities effective for curing perfluoroelastomers are disclosed in U.S. Pat. No. 5,565,512.

A preferred cure system utilizes bis(aminophenols) and bis(aminothiophenols) of the formulas

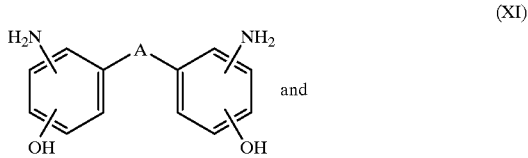

(XI)

and

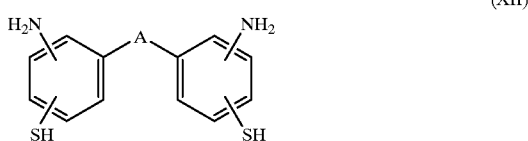

(XII)

and tetraamines of the formula

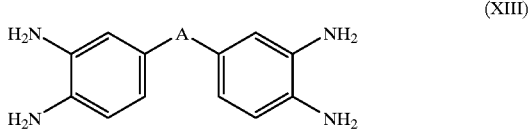

(XIII)

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formulas XI and XII above are interchangeably in the meta and para positions with respect to the group A. Preferably, the curing agent is a compound selected from the group consisting of 4,4'-[2,2,2-trifluoro-1-(trifluoromethyl)ethylidene]bis(2-aminophenol); 4,4'-sulfonylbis(2-aminophenol); 3,3'-diaminobenzidine; and 3,3',4,4'-tetraaminobenzophenone. The first of these is the most preferred and will be referred to as diaminobisphenol AF (DABPAF). DABPAF is preferred because compression sets of perfluoroelastomers cured with this compound are unusually good (i.e. low). The amino curing agents can be prepared as disclosed in U.S. Pat. No. 3,332,907 to Angelo. DABPAF can be prepared by nitration of 4,4'-[2,2,2-trifluoro-1-(trifluoromethyl) ethylidene]-bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. The level of curing agent should be chosen to optimize the desired properties of the vulcanizate. In general, a slight excess of curing agent over the amount required to react with all the cure sites present in the polymer is used. Typically, 0.5–5.0 parts by weight of the curative per 100 parts of polymer is required. The preferred range is 1.0–2.0 parts.

Additives, such as carbon black, stabilizers, plasticizers, lubricants, fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. A grade commonly chosen is SAF carbon black, a highly reinforcing black with typical average particle size of about 14 nm and designated N 110 in Group No. 1, according to ASTM D 1765. A particular class of carbon blacks useful in the compositions of the present invention are those described in WO 95/22575. These carbon blacks have average particle sizes of at least about 100 nm to about 500 nm as determined by ASTM D-3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, or in the alternative, fluoropolymer fillers may be present in the composition. Generally from 1 to 50 parts phr of a fluoropolymer filler is used, and preferably at least about 5 phr is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the compositions of the invention include, but are not limited to, those based on the group of polymers known as tetrafluoroethylene (TFE) polymers. This group includes homopolymers of TFE (PTFE) and copolymers of TFE with small concentrations of at least one copolymerizable modifying monomer such that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include those derived from suspension polymerization as well as those derived from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of $0.5–60 \times 10^3$ Pa.s, but viscosities outside this range are also known. Perfluoroolefins and perfluoro(alkyl vinyl) ethers are preferred comonomers. Hexafluoropropylene and perfluoro(propyl vinyl) ether are most preferred. Melt fabricable TFE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The curable compositions of the present invention are useful in production of gaskets, tubing, and seals. Such articles are generally produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, and in seals for high temperature automotive uses.

The invention is now illustrated by certain embodiments wherein all parts are by weight unless otherwise specified.

EXAMPLES

TEST METHODS

HF Generation Test

Test specimens consisting of 1 g samples of sections of standard AS 568–214 O-rings that had been cured for 10 hours under nitrogen at 305° C. were prepared from the various perfluoroelastomer compounds described in the Examples below. To conduct the test, a 1.0 g specimen was placed in a platinum boat and the boat placed in a chromium plated stainless steel tube having an internal diameter of approximately 36 mm. The tube was heated at 300° C. for 30 min. while a stream of nitrogen (100 ml/min.) passed through the tube. The gas exiting the tube was passed through a 2 mM solution of $NaHCO_3$ in order to trap any HF formed. The solution was then analyzed for fluoride ion by ion chromatography on a Dionex 2000i ion chromatograph using an AS4 column and a flow rate of 1.5 ml/minute of 2 mM $NaHCO_3$ eluent. The fluoride ion concentrations thus measured were assumed to be completely attributable to HF generated during heating of the samples. Results were expressed as ppm HF.

Steel Corrosion Test

O-ring test specimens were prepared according to ASTM D 395 from the various perfluoroelastomer compounds described in the Examples. The O-rings were press cured in a mold at 177° C. for 16 minutes, then removed from the mold and post cured under nitrogen for 10 hours at 305° C. The resulting cured O-rings were individually placed on a stainless steel 304 plate and heated in an air oven at 300° C. for 70 hours. HF released from the O-rings during heating caused visible corrosion (i.e. a black discoloration) to form on the steel plate. The degree of corrosion of the steel plate was rated independently by 3 observers on a scale of 0 to 4, where 0=no visual corrosion, 1=slight corrosion (very light gray ring), and 4=severe corrosion (black ring). The average of the three ratings was reported.

Cure Characteristics

Cure characteristics were measured using a Monsanto MDR 2000 instrument under the following conditions:

Moving die frequency: 1.66 Hz

Oscillation amplitude: 1.0

Temperature: 177° C., unless otherwise noted

Sample size: Disks having diameter of 45 mm, and thickness of 5 mm

Duration of test: 20 minutes

The following cure parameters were recorded:

$M_H$: maximum torque level, in units of N·m
$M_L$: minimum torque level, in units of N·m
$t_s1$: minutes to 0.04 N·m rise above $M_L$
$t_c90$: minutes to 90% of maximum torque Test specimens were prepared from elastomer compounded with appropriate additives, as described in the formulations listed in the Examples below. Compounding was carried out on a rubber mill or in a Banbury mixer. The milled composition was formed into a sheet and a 10 g sample was died out into a disk to form the test specimen.

Cure characteristics were determined by placing a test specimen in the sealed test cavity of the instrument which was maintained under a positive pressure and elevated temperature. A biconical disk was embedded in the test specimen and was oscillated through an arc of 0.5° at the specified frequency, thereby exerting a shear strain on the test specimen. The force at maximum amplitude (torque) required to rotate the disk is proportional to the stiffness (shear modulus) of the rubber. This torque was recorded as a function of time. Because stiffness of a rubber specimen increases during curing, the test provides a measure of curability. A test is completed when the recorded torque either reaches equilibrium or maximum value, or when a predetermined time has elapsed. The time required to obtain a curve is a function of the test temperature and the characteristics of the rubber compound.

Tensile Properties

Unless otherwise noted, stress/strain properties were measured on test specimens that had been post cured under nitrogen for 24 hours at 305° C. Physical property measurements were obtained according to methods described in ASTM D 412. The following parameters were recorded:

$M_{100}$, modulus at 100% elongation in units of MPa $T_B$, tensile strength at break in units of MPa $E_B$, elongation at break in units of %

Compression set of 0-ring samples was determined in accordance with ASTM D 395.

The following polymers were used in the Examples:

Polymer A—A terpolymer containing 67.9 mole percent units of TFE, 31.5 mole percent units of perfluoro(methyl vinyl) ether (PMVE) and 0.60 mole percent units of 8-CNVE was prepared according to the general process described in U.S. Pat. No. 4,281,092.

Polymer B—A terpolymer containing 68.2 mole percent units of TFE, 31.0 mole percent units of PMVE and 0.80 mole percent units of 8-CNVE was prepared according to the general process described in PCT Publication WO 9719982 and in U.S. Pat. No. 5,789,509.

Polymer C—A terpolymer containing 68.6 mole percent units of TFE, 30.4 mole percent units of PMVE and 1.03 mole percent units of 8-CNVE was prepared according to the general process described in PCT publication WO 9719982 and in U.S. Pat. No. 5,789,509.

Examples 1–2 and Comparative Examples A and B

Test specimens formulated according to the recipes shown in Table I below were subjected to the above-described Test Methods. The results are also shown in Table I. The compositions of this invention (i.e. the samples of Examples 1 and 2) containing 3 parts and 1 part anhydrous silica, respectively, generated markedly less HF when exposed to heat than did the comparative samples. Tensile properties of the compositions of the invention were at least comparable to those of the comparative examples. Cure characteristics were also at least comparable to those of the comparative examples.

TABLE I

| Formulation (phr) | Comparative Example A | Comparative Example B | Example 1 | Example 2 |
|---|---|---|---|---|
| Polymer A | 100 | — | — | — |
| Polymer B | — | 100 | — | 100 |
| Polymer C | — | — | 100 | — |
| SAF Carbon Black | 12 | — | — | — |
| Ammonium Perfluorooctanoate | — | 0.5 | 0.5 | 0.5 |
| Dicyclohexyl-18-crown-6 | 0.3 | — | — | — |
| Tetraphenyltin | 3 | — | — | — |
| Silica[1] | — | — | 3 | 1 |
| Titanium dioxide | — | 6.5 | 6.5 | 6.5 |
| Tensile Properties[2] | | | | |
| $M_{100}$ (MPa) | 6.6 | 2.3 | 3.6 | 2.3 |
| $T_B$ (MPa) | 14.3 | 15.4 | 18.2 | 15.2 |
| $E_B$ (%) | 145 | 287 | 246 | 304 |
| Compression Set[3] | 47.6 | 35 | 35 | 34 |
| Cure Characteristics | | | | |
| ML (N.m) | — | — | 0.126 | 0.070 |
| MH (N.m) | — | — | 0.669 | 0.53 |
| $t_s1$ (minutes) | — | — | 1.60 | 2.05 |
| $t_c90$ (minutes) | — | — | 10.05 | 10.85 |
| HF Generation (ppm) | 2000 | 49 | 7 | 6 |

[1]Aerosil ® anhydrous silica
[2]Post cured under nitrogen for 42 hours at 305° C.
[3]200° C. @ 336 hours Examples 3–5 and Comparative Examples C–E Polymers B and C were compounded with the ingredients shown in Table II in the amounts specified. O-ring specimens of each compound were tested to determine corrosiveness of the compounded compositions. Results are shown in Table II. This set of Examples illustrates the superiority of the compositions of the invention, which contain anhydrous silica, compared to the compositions of the Comparative Examples which contain typical acid scavengers used in the rubber industry (ZnO and Ca(OH)$_2$). As shown in Table II only compounds containing anhydrous silica did not visibly corrode stainless steel plates.

TABLE II

| Formulation (phr) | Comp. Ex. C | Comp. Ex. D | Comp. Ex. E | Sample 1 | Sample 2 | Sample 3 |
|---|---|---|---|---|---|---|
| Polymer B | 100 | 100 | 100 | 10 | 0 | 0 |
| Polymer C | 0 | 0 | 0 | 0 | 100 | 100 |
| Ammonium perfluorooctanoate | 1 | 1 | 1 | 1 | 1 | 1 |
| DABPAF | 1.5 | 1.5 | 1.5 | 1.5 | 1.5 | 1.5 |
| TiO$_2$ | 6.5 | 6.5 | 6.5 | 6.5 | 6.5 | 6.5 |
| SiO$_2$[4] | 0 | 0 | 0 | 6.5 | 6.5 | 3 |

TABLE II-continued

| Formulation (phr) | Comp. Ex. C | Comp. Ex. D | Comp. Ex. E | Sample 1 | Sample 2 | Sample 3 |
|---|---|---|---|---|---|---|
| ZnO | 0 | 1 | 0 | 0 | 0 | 0 |
| Ca(OH)$_2$ | 0 | 0 | 1 | 0 | 0 | 0 |
| Corrosion Rating | 2.5 | 4 | 4 | 0 | 0 | 0 |

[4]Aerosil ® 200 anhydrous silica

Examples 6–9 and Comparative Example F

Polymers B and C were compounded with the ingredients shown in Table III in the amounts specified. In addition to greatly reducing HF evolution, anhydrous silica also accelerates the cure rate of perfluoroelastomer compounds as shown below in Table III. The higher the level of anhydrous silica in the curable compound, the faster the cure, as indicated by the decrease in $t_c90$ from 11.87 when no anhydrous silica was present to 9.23 minutes when 3 phr anhydrous silica was present in the compound.

TABLE III

| Formulation (phr) | Comp. Ex. F | Sample 6 | Sample 7 | Sample 8 | Sample 9 |
|---|---|---|---|---|---|
| Polymer B | 100 | 100 | 100 | 100 | 0 |
| Polymer C | 0 | 0 | 0 | 0 | 100 |
| DABPAF | 1.5 | 1.5 | 1.5 | 1.5 | 1.5 |
| TiO$_2$ | 6.5 | 6.5 | 6.5 | 6.5 | 6.5 |
| SiO$_2$[5] | 0 | 1 | 2 | 3 | 3 |
| $t_c$ 90 (minutes)[6] | 11.87 | 11.10 | 9.28 | 9.23 | 7.46 |

[5]Aerosil ® 200 anhydrous silica
[6]at 204° C.

I claim:

1. A curable composition comprising
   A. a perfluoroelastomer comprising copolymerized units of (1) tetrafluoroethylene, (2) a perfluoro(vinyl ether) selected from the group consisting
   B. of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers;
   C. 1–25 parts by weight per hundred parts by weight perfluoroelastomer of an anhydrous silica; and
   D. a curative for the perfluoroelastomer, said curative selected from the group consisting of i) an ammonium salt of an organic or inorganic acid; ii) a bis(aminophenol); and iii) a bis(aminothiophenol).

2. The composition of claim 1 wherein the perfluoro(vinyl ether) is a perfluoro(alkyl vinyl) ether.

3. The composition of claim 1 wherein the perfluoro(vinyl ether) is a perfluoro(alkoxy vinyl) ether.

4. The composition of claim 1 wherein the cure site monomer is a fluorinated olefin.

5. The composition of claim 1 wherein the cure site monomer is a nitrile-containing fluorinated vinyl ether.

6. The composition of claim 2 wherein the perfluoro(alkyl vinyl) ether is perfluoro(methyl vinyl) ether.

7. The composition of claim 5 wherein the nitrile-containing fluorinated vinyl ether is a compound of the formula

where x=1–2 and n=1–4.

8. The composition of claim 7 wherein the fluorinated vinyl ether is 8-cyano-5-methyl-3,6-dioxa-1-octene.

9. The composition of claim 5 wherein the nitrile-containing fluorinated vinyl ether is a compound of the formula

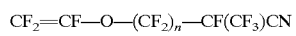

where n=2–4.

10. The composition of claim 1 wherein the anhydrous silica is present in an amount of 1–7 parts by weight per hundred parts by weight perfluoroelastomer.

11. The composition of claim 1 wherein the curative is an ammonium salt of an organic or inorgic acid.

12. The composition of claim 1 wherein the curative is selected from the group consisting of bis(inophenols) of the formula

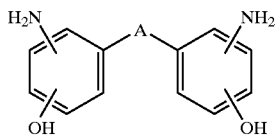

bis(aminothiophenols) of the formula

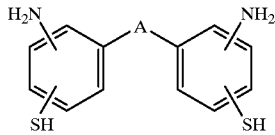

and tetraamines of the formula

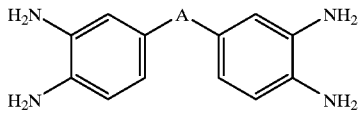

where A is SO$_2$, O, CO, alkyl of 1–6 carbon atoms, perfluoroalkyl of 1–10 carbon atoms, or a carbon-carbon bond linking the two aromatic rings.

13. The composition of claim 12 wherein the curative is 4,4'-[2,2,2-trifluoro-1-(trifluoromethyl)ethylidene]bis(2-aminophenol).

14. The composition of claim 1 wherein the curative is present in an amount of 0.5–5.0 parts by weight per hundred parts perfluoroelastomer.

15. The composition of claim 13 further comprising an ammonium salt of an organic acid.

* * * * *